United States Patent
Martinelli

(10) Patent No.: US 8,553,376 B2
(45) Date of Patent: Oct. 8, 2013

(54) SYNCHRONOUS RECTIFIED PWM REGULATOR WITH AUTO FAULT CLEARING

(75) Inventor: Robert Matthew Martinelli, Murrieta, CA (US)

(73) Assignee: The Boeing Company, Chicago, IL (US)

( * ) Notice: Subject to any disclaimer, the term of this patent is extended or adjusted under 35 U.S.C. 154(b) by 244 days.

(21) Appl. No.: 12/965,823

(22) Filed: Dec. 11, 2010

(65) Prior Publication Data

US 2012/0147635 A1   Jun. 14, 2012

(51) Int. Cl.
*H02H 7/10* (2006.01)
*H02M 5/458* (2006.01)

(52) U.S. Cl.
USPC .......... 361/18; 361/104; 363/34; 363/37

(58) Field of Classification Search
USPC .................. 361/18, 104; 363/34, 37
See application file for complete search history.

(56) References Cited

U.S. PATENT DOCUMENTS

| | | | |
|---|---|---|---|
| 4,691,159 A | | 9/1987 | Ahrens et al. |
| 5,504,418 A | | 4/1996 | Ashley |
| 6,021,059 A | * | 2/2000 | Kennedy ................. 363/127 |
| 6,108,220 A | * | 8/2000 | Franke .................... 363/37 |
| 6,617,831 B2 | * | 9/2003 | Perol ...................... 323/234 |
| 6,911,848 B2 | * | 6/2005 | Vinciarelli ............... 327/108 |
| 7,944,068 B2 | * | 5/2011 | Wagoner et al. .......... 290/44 |

FOREIGN PATENT DOCUMENTS

JP   2003070258   * 3/2003

* cited by examiner

*Primary Examiner* — Rexford Barnie
*Assistant Examiner* — Zeev V Kitov
(74) *Attorney, Agent, or Firm* — Ameh IP; Elahe Toosi; Lowell Campbell

(57) ABSTRACT

A fault tolerant synchronous rectifier PWM regulator system and method are disclosed. In the system and method, a force commutated synchronous rectifier is operable to be coupled to an electrical bus, and a low side switch is operable to be coupled to a common ground. In addition, a first fuse is coupled to the force commutated synchronous rectifier and the low side switch, and is operable to open in response to a first fault. Furthermore, an inductor is coupled to the first fuse, the force commutated synchronous rectifier and the low side switch, and a second fuse is coupled to the inductor and is operable to be coupled to a current source and to open in response to a second fault.

20 Claims, 4 Drawing Sheets

SYNCHRONOUS RECTIFIED PWM REGULATOR WITH AUTO FAULT CLEARING

FIELD

Embodiments of the present disclosure generally relate to voltage and current regulating systems. More particularly, embodiments of the present disclosure relate to voltage and current regulating systems that may have application for electrical power sources and loads, which may comprise spacecraft solar panels or other types of power sources coupled in a series, parallel, and other type of arrangement.

BACKGROUND

Many types of electrical power sources such as solar arrays may comprise single or multiple elements coupled in series, parallel, or other appropriate configuration. The power sources may be coupled to a load, such as but without limitation, an electrical bus, a battery, and the like. The power sources may also be coupled to power regulators whereby current can be directed to the load or diverted away from the load by, for example but without limitation, shorting out circuits and returning current back to the power sources. In some electrical systems such as a closed electrical system, for example but without limitation, a spacecraft, a ship, and the like, controlling current in this manner may be required to maintain voltage regulation of an electrical bus. For example but without limitation, in a closed electrical system comprising a regulated electrical bus, current may be provided to satisfy an electrical demand of a load, and excess current from the load may not be used. Control circuits may be used to divert current away from a subset of power sources of a group of power sources to match power output meet a load demand. Voltage regulation and control circuits used to regulate electrical buses and power sources may fail in a shorted mode.

SUMMARY

A fault tolerant synchronous rectifier PWM regulator system and method are disclosed. In the system and method, a force commutated synchronous rectifier is operable to be coupled to an electrical bus, and a low side switch is operable to be coupled to a common ground. In addition, a first fuse is coupled to the force commutated synchronous rectifier and the low side switch, and is operable to open in response to a first fault. Furthermore, an inductor is coupled to the first fuse, the force commutated synchronous rectifier and the low side switch, and a second fuse is coupled to the inductor and is operable to be coupled to a current source and to open in response to a second fault.

By using the force commutated synchronous rectifier as well as a combination of the fuses, embodiments of the disclosure automatically clear faults using an automatic fault tolerant system at a significantly reduced power dissipation. Lower power dissipation significantly reduces a weight of the aforementioned power stage devices thereby reducing, for example but without limitation, spacecraft weight, and the like. Reducing the weight also translates into space and cost savings, which are useful for many types of power sources and load interaction devices.

In an embodiment, a fault tolerant synchronous rectifier PWM regulator system comprises a force commutated synchronous rectifier operable to couple to an electrical bus, and a low side switch operable to be coupled to a common ground. The system further comprises a first fuse coupled to the force commutated synchronous rectifier and the low side switch and operable to open in response to a first fault, and an inductor coupled to the first fuse, the force commutated synchronous rectifier, and the low side switch. The system further comprises a second fuse coupled to the inductor and operable to be coupled to a current source, and operable to open in response to a second fault.

In another embodiment, an automatic fault tolerant synchronous rectified PWM regulation method synchronously rectifies a current from a current source into a current for an electrical bus using a force commutated synchronous rectifier coupled to a bypass rectifier and operable to be coupled to an electrical bus, an inductor coupled to the force commutated synchronous rectifier, and a low side switch coupled to a common ground. The method further provides a first fuse coupled to the force commutated synchronous rectifier and the low side switch, and provides a second fuse coupled to the bypass rectifier and the inductor.

Yet another embodiment comprises a method for operating a fault tolerant synchronous rectified PWM regulator system. The method synchronously rectifies a current from a current source into a current for an electrical bus coupled to an input capacitor, using a force commutated synchronous rectifier coupled to the electrical bus, a bypass rectifier coupled to the force commutated synchronous rectifier and the current source, an inductor coupled to the force commutated synchronous rectifier and an input capacitor, and a low side switch coupled to a common ground.

The method further opens a first fuse coupled to the force commutated synchronous rectifier and the low side switch, if a fault occurs in the force commutated synchronous rectifier, and opens the first fuse, if a fault occurs in the low side switch. The method also opens a second fuse coupled to the inductor and the current source, if a fault occurs in the current source, and opens the second fuse, if a fault occurs in the bypass rectifier. The method also opens a third fuse coupled to the input capacitor and the common ground, if a fault occurs in the input capacitor, and opens a fourth fuse couple to the output capacitor and the common ground, if a fault occurs in the output capacitor.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
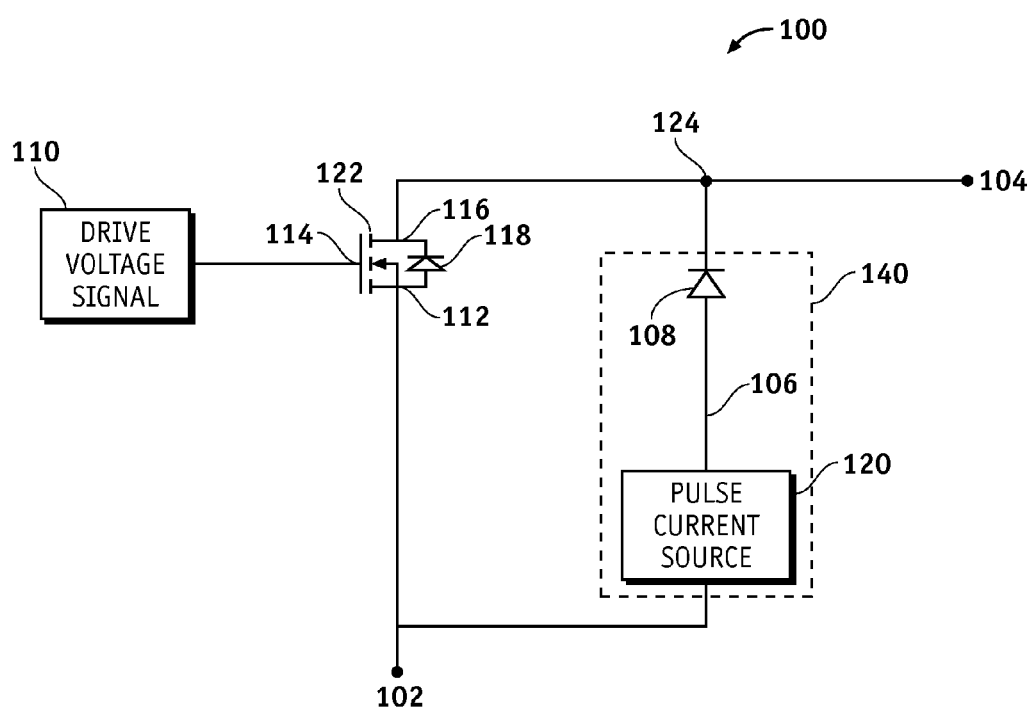
FIG. 1 is an illustration of an exemplary force commutated synchronous rectifier according to an embodiment of the disclosure.

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to circuit design, and other functional aspects of the systems (and the individual operating components of the systems) may not be described in detail herein. In addition, those skilled in the art will appreciate that embodiments of the present disclosure may be practiced in conjunction with a variety of computational hardware and software, and that the embodiments described herein are merely example embodiments of the disclosure.

Embodiments of the disclosure are described herein in the context of a practical non-limiting application, namely, voltage conversion on a satellite or a spacecraft. Embodiments of the disclosure, however, are not limited to such satellite or spacecraft applications, and the techniques described herein may also be utilized in other applications. For example but without limitation, embodiments may be applicable to, aircraft, ships, automobiles, buildings, trains, a super-heated thermal couple from a reactor, various voltage conversion applications and circuits, and the like.

The embodiments apply to substantially all types of series/parallel electrical power generation sources (power sources), as well as substantially all types of vehicles that have power sources and loads that may communicate energy. The loads may comprise, for example but without limitation, a battery, an electrical bus, various loads, an appliance, a motor, a heater, a power distribution system, and the like. The power sources may comprise, for example but without limitation, satellite power sources, spacecraft power sources, aircraft power sources, shipboard generators, train power sources, solar and engine powered long-duration aircraft and spacecraft (manned and unmanned) power sources, and the like. Additionally, embodiments of the disclosure may apply to, for example but without limitation, solar, wind, and marine wave energy generation farms/power sources, generator arrays, and the like.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

In various applications, a power source (e.g., a spacecraft solar panel or other power source) is coupled to another device (e.g., an electrical bus or another load) through a voltage regulator. Embodiments of the disclosure comprise a synchronous rectifier PWM regulator system comprising a force commutated synchronous rectifier as well as a combination of fuses that result in a fault tolerant system. In the fault tolerant system, if a component shorts, one or more of the fuses opens and the power source remains coupled to the another device. The synchronous rectifier PWM regulator system is operable to function as a synchronous rectifier boost converter.

FIG. 1 is an illustration of an exemplary force commutated synchronous rectifier 100 (system 100) according to an embodiment of the disclosure. FIG. 1 shows a bi-directional converter where current can flow from a first bus 102 (input terminal 102) (e.g., from a battery) to a second bus 104 (output terminal 104) (e.g., to a satellite or a spacecraft 100V bus) or from the second bus 104 to the first bus 102 depending on a duty cycle of power switches (not shown). Since very small duty cycle changes can change a direction of a current from discharging the first bus 102 to charging the first bus 102, it is desirable to measure an inductor current of an inductor coupled to the force commutated synchronous rectifier 100, so that feedback loops can be added to allow fine control of both a magnitude and a direction of current flow.

The force commutated synchronous rectifier 100 comprises a switching component, such as a field effect transistor (FET) 122 electrically coupled to a forced commutation circuit 140. The FET 122 comprises a source terminal 112, a gate terminal 114, a drain terminal 116, and an intrinsic body diode 118. For example but without limitation, the FET 122 shown in FIG. 1 comprises an n-type FET, where, an anode of the intrinsic body diode 118 is connected to the source terminal 112, and a cathode of the intrinsic body diode 118 is connected to the drain terminal 116.

While the embodiment shown in FIG. 1 utilizes an n-type FET as an example, the FET 122 may comprise any switching component, such as but without limitation, the n-type FET, a p-type FET, a switch, or the like, that comprises an intrinsic body diode that may have an associated reverse recovery time. In an embodiment where the FET 122 is a p-type FET, a direction of the intrinsic body diode 118 may be reversed, such that a cathode of the intrinsic body diode 118 is connected to a source terminal of the p-type FET and an anode of the intrinsic body diode 118 is connected to a drain terminal of the p-type FET.

Typically, n-type FETs allow a current to flow between the source terminal 112 and the drain terminal 116 when the gate terminal 114 is supplied with a voltage greater than a threshold voltage associated with switching on the FET Q. When the voltage supplied to the gate terminal 114 is reduced to below the threshold voltage or is removed completely, the FET 122 is switched off and the current flowing between the source terminal 112 and the drain terminal 116 stops flowing. If the current is flowing from the source terminal 112 to the drain terminal 116 when the FET 122 is switched off, the intrinsic body diode 118 of the FET 122 requires a period of time to recover since the current was flowing in the forward-bias direction of the intrinsic body diode 118. This is called the reverse recovery time.

However, if the current is flowing from the drain terminal 116 to the source terminal 112 when the FET 122 is switched off, there is no reverse recovery time needed since the current was already flowing in the reverse-bias direction of the intrinsic body diode 118. Using the concepts described above, the reverse recovery time of a diode can be eliminated by forced commutating a current from a cathode terminal of a diode to an anode terminal of the diode during the switch-off event associated with the FET 122.

The gate terminal 114 of the FET 122 is electrically coupled to a drive voltage source 110, which controls the switching of the FET 122. When the drive voltage source 110 provides a voltage greater than the threshold voltage to the gate terminal 114, the FET 122 is switched on. When the gate terminal 114 of the FET 122 does not have a voltage, the FET 122 is switched off. A current is configured to flow into the source terminal 112 of the FET 122 through an input terminal 102, while the current flowing out of the FET 122 flows towards an output terminal 104.

As described above, the FET 122 is electrically coupled to the forced commutation circuit 140. The forced commutation circuit 140 comprises a pulse current source 120 (selectively controlled forced commutation current source) and a commutation diode 108. The pulse current source 120 may be configured to generate a commutation current that is configured to be greater than a current entering through the input terminal 102. In one embodiment, the commutation current is a pulse current that is supplied from the force commutated synchronous rectifier 100 for a very brief period of time. The pulse current source 120 is electrically coupled to an anode terminal of the commutation diode 108 at terminal 106.

The commutation diode 108 comprises an anode terminal (not shown), which is electrically coupled to the pulse current source 120 at the terminal 106. The commutation diode 108 also comprises a cathode terminal (not shown), which is electrically coupled to the drain terminal 116 of the FET 122 and the output terminal 104 at node 124. In this way, the commutation diode 108 is in parallel with the FET 122. The commutation diode 108 should be arranged in such a manner that the cathode terminal of the commutation diode 108 is connected to the cathode terminal of the intrinsic body diode 118.

The force commutated synchronous rectifier 100 may operate in four phases. In a first phase, both the FET 122 and the pulse current source 120 are switched off such that the pulse current source 120 is not supplying a commutation current. In this phase, an input current enters the force commutated synchronous rectifier 100 at the input terminal 102, flows through the commutation diode 108, and outputs the force commutated synchronous rectifier 100 at the output terminal 104.

In a second phase, the FET 122 is switched on and the pulse current source 120 remains switched off. In this phase, the input current enters at the input terminal 102 and flows through the FET 122 from the source terminal 112 to the drain terminal 116, and exits through the output terminal 104. The current no longer flows through the commutation diode 108 since the voltage drop across the FET 122 is smaller than a forward voltage of the commutation diode 108.

In a third phase, while the FET 122 is switched on, the pulse current source 120 is also switched on. In this phase, the input current enters the force commutated synchronous rectifier 100 at the input terminal 102, and flows through the pulse current source 120 and the commutation diode 108. In addition, the pulse current source 120 supplies a commutation current that flows through the commutation diode 108 and the FET 122. At the node 124, the input current flows to the output terminal 104, while the commutation current passes through the FET 122 from the drain terminal 116 to the source terminal 112.

In a fourth phase, the FET 122 is switched off while the commutation current is flowing through the FET 122 from the drain terminal 116 to the source terminal 112. In this phase, the commutation current stops flowing and the input current flows through the commutation diode 108 and outputs at the output terminal 104. To eliminate the reverse recovery time associated with the intrinsic body diode 118 of the FET 122, the FET 122 should be switched off while a current is flowing through the FET 122 from the drain terminal 116 to the source terminal 112 (opposite the direction of the intrinsic body diode 118). By following the sequence of events delineated by the four phases, the FET 122 is switched off while the commutation current is flowing through the FET 122 from the drain terminal 116 to the source terminal 112. Accordingly, the reverse recovery time associated with the FET 122 is eliminated.

The force commutated synchronous rectifier 100 described above may be utilized as a building block for a variety of applications. In particular, switching applications that utilize a switching component that comprises an intrinsic body diode may perform more efficiently through the utilization of the force commutated synchronous rectifier 100 described above. In addition, switching regulators, such as buck converters, boost converters, and buck-boost converters, may also utilize the force commutated synchronous rectifier 100 described above.

Conventional switching regulators may use a rectifier to provide a current path for the inductor current during an off time of a main FET. With modern improvements, it has become practical to replace rectifier with FETs as the reverse recovery time of the FET switches have become quite small with very little energy dissipated as a result. However, in high voltage applications, reverse recovery times are relatively substantial, causing significant power dissipation as well as limits on the switching frequency of the FET.

The high voltage application, may comprise, for example but without limitation, the exemplary satellite bus mentioned above, commercial and military aircraft, land and sea based: solar, wind, and marine power sources, and the like. The high voltage application, may also comprise, for example but without limitation, long endurance unmanned aerial vehicles (UAVs) that comprise solar and engine power sources feeding batteries and other high voltage buses such as, airborne radar, communication systems, and the like. Additionally, the high voltage application, may comprise spacecraft (manned and unmanned), such as but without limitation, reusable and single-mission vehicles, and the like.

To eliminate the reverse recovery time of an intrinsic body diode of a FET is utilized as a rectifier in high voltage switching regulator applications, such as a boost converter. A conventional rectifier or synchronous switched FET may be replaced with the force commutated synchronous rectifier 100 described in FIG. 1. In rectification applications involving a switch, the rectification cycles through the four phases described above may be used. These cycles may be referred to as a rectifier switch cycle. The fourth phase occurs at the switch-off edge of the rectifier switch cycle. In high voltage rectifier applications, the voltage applied to the switch, such as the FET, may be greater than 60 V.

Figure 2:
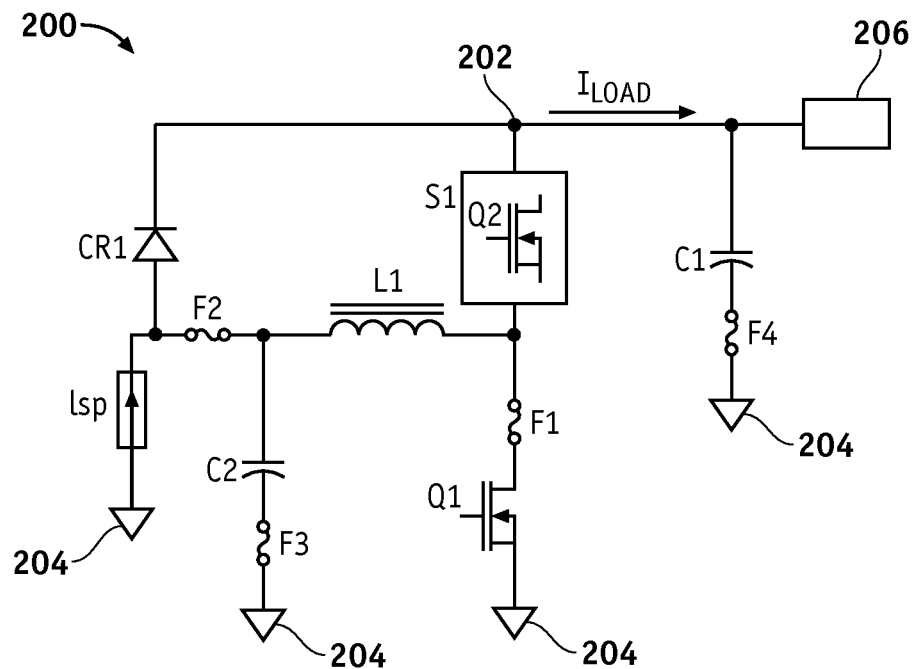
FIG. 2 is an illustration of an exemplary fault tolerant synchronous rectifier PWM regulator system according to an embodiment of the disclosure.

FIG. 2 is an illustration of an exemplary fault tolerant synchronous rectified PWM regulator system 200 (system 200) according to an embodiment of the disclosure. The system 200 may comprise, a force commutated synchronous rectifier S1 (high side switch) as described above, a low side switch Q1 coupled to a low side fuse F1, an output capacitor C1, an input capacitor C2, a fuse F2, an inductor L1, a bypass rectifier CR1, a fuse F3, a fuse F4, a current source Isp, an electrical bus 202, and a common ground 204. The system 200 is operable to function as a synchronous rectified boost converter. By using the force commutated synchronous rectifier S1 as well as a combination of the fuses F1-F4, the system 200 provides a fault tolerant system at a significantly reduced power dissipation which in turn reduces the weight of the system 200 thereby reducing the weight of a spacecraft as explained in more detail below.

As shown in FIG. 2, the fuses F1, F2, F3, and F4 are coupled in series to the low side switch Q1, the current source Isp, the input capacitor C2, and the output capacitor C1 respectively. As a result, if any component of the system 100 has a fault (e.g., shorts), one or more of the fuses F1-F4 opens and the current source Isp remains connected to, for example, a load 206 via an electrical bus 202 through the bypass rectifier CR1. In this manner, the system 200 provides a fault tolerant system. The fault may comprise, for example but without limitation, a short, an overload current, a stuck-closed fault, and the like. In this document, short and fault may be used interchangeably. The load 206 may comprise, for example but without limitation, an electrical bus, an appliance, a motor, a battery, a heater, a power distribution system, and the like.

The low side fuse F1 is coupled in series to the low side switch Q1, and is operable to open if the force commutated synchronous rectifier S1 shorts. In this manner, the current source Isp will remain connected to the electrical bus 202 through both the bypass rectifier CR1 and the force commutated synchronous rectifier S1. The low side fuse F1 is also operable to open if Q1 shorts. In this manner, the current source Isp will remain connected to the electrical bus 202.

The fuse F2 is coupled in series to the current source Isp and is operable to open if the bypass rectifier CR1 shorts. If the bypass rectifier CR1 shorts high current will circulate in the inductor L1, the bypass rectifier CR1, and a path of the force commutated synchronous rectifier S1 until the fuse F2 opens. In this manner, the current source Isp will remain connected to the electrical bus 202. The fuse F2 is also operable to open if the current source Isp shorts to the common ground 204. In this case the current source Isp no longer provides power to the electrical bus 202.

The force commutated synchronous rectifier S1 is coupled to the fuse F1, the bypass rectifier CR1, the output capacitor C1, the inductor L1, and the electrical bus 202. The force commutated synchronous rectifier S1 (high side switch) comprises a FET Q2 and is operable to convert DC currents from the current source Isp into voltage regulated AC currents on the electrical bus 202. Generally a high side switch (coupled to a bus) is a rectifier. However, in the embodiment shown in FIG. 1, the force commutated synchronous rectifier S1 is used as the high side switch so that power dissipation is significantly reduced.

Synchronous rectification reduces the power dissipation in a power device. Lower power dissipation reduces the weight of the power devices since less heat sink material is required and components may be packaged more densely. In this manner, weight of a vehicle, such as but without limitation, a spacecraft, and the like can be reduced since less thermal management hardware is required. The synchronous rectification also improves control loop stability over a wider range of power source (e.g., the current source Isp) variation and bus current since the boost converter does not have to work in discontinuous conduction mode where the transfer functions change dramatically.

The output capacitor C1 is coupled in series to the fuse F4 and the electrical bus 202 and is operable to receive charge from the current source Isp.

The input capacitor C2 is coupled in series to the fuse F3 and is operable to provide AC grounding for the inductor L1.

The inductor L1 is coupled to the low side fuse F1, the fuse F2, the input capacitor C2, and the force commutated synchronous rectifier S1 and is operable to provide energy storage for the boost converter of the system 200. In an existing solution, if a low side switch Q1 connects the current source Isp permanently to a common ground, power is lost. However, in contrast to the existing solution, in the embodiments shown in FIG. 1, if the low side switch Q1 connects the current source Isp to the common ground 204, the force commutated synchronous rectifier S1 turns on, the low side fuse F1 opens and removes the short to the common ground 204, leaving the current source Isp connected (or coupled) to the electrical bus 202.

The bypass rectifier CR1 is coupled to the force commutated synchronous rectifier S1, the fuse F2, the current source Isp, and the electrical bus 202 and is operable to bypass current to the electrical bus 202 if F2 is open.

The current source Isp may comprise a power source, such as but without limitation, a solar array (e.g., used as a power source of a satellite or a spacecraft bus), a battery, and the like. As mentioned above, the system 200 can also regulate other types of power sources, such as but without limitation, other satellite and spacecraft aircraft power sources, shipboard generators, train power sources, solar and engine powered long-duration aircraft and spacecraft (manned and unmanned) power sources, and the like.

The electrical bus 202 is operable to distribute electrical current, and may be, for example but without limitation, a spacecraft power bus, a satellite power bus, a ship electrical bus, an automobile electrical bus, a power grid electrical bus, and the like.

The system 200 is operable to function as a synchronous boost converter with the low side fuse F1 coupled to the low side switch Q1 and the low side fuse F1 and the fuse F2 in boost inductor paths through the inductor L1. In this manner, the system 200 automatically clears faults when any power stage device such as the force commutated synchronous rectifier S1, the low side switch Q1, the output capacitor C1, the input capacitor C2, the bypass rectifier CR1, and the current source Isp, fails in a shorted/fault mode.

In one embodiment, the capacitor fuses F3 and F4 may comprise, for example but without limitation, series redundant capacitors.

The system 200 results in a substantially highest possible efficiency since a boost circuit path comprises one FET (e.g., Q1 or Q2), which has a lower voltage drop than a diode would generally have.

Since the power stage is synchronous rectified, a current of the inductor L1 can operate in a continuous mode and therefore control loop transfer functions will be more uniform over a full operating range of the load current $I_{LOAD}$ and a voltage of the current source Isp. This allows the system 200 to accommodate a lower inductance value which in turn translates to less weight.

Figure 3:
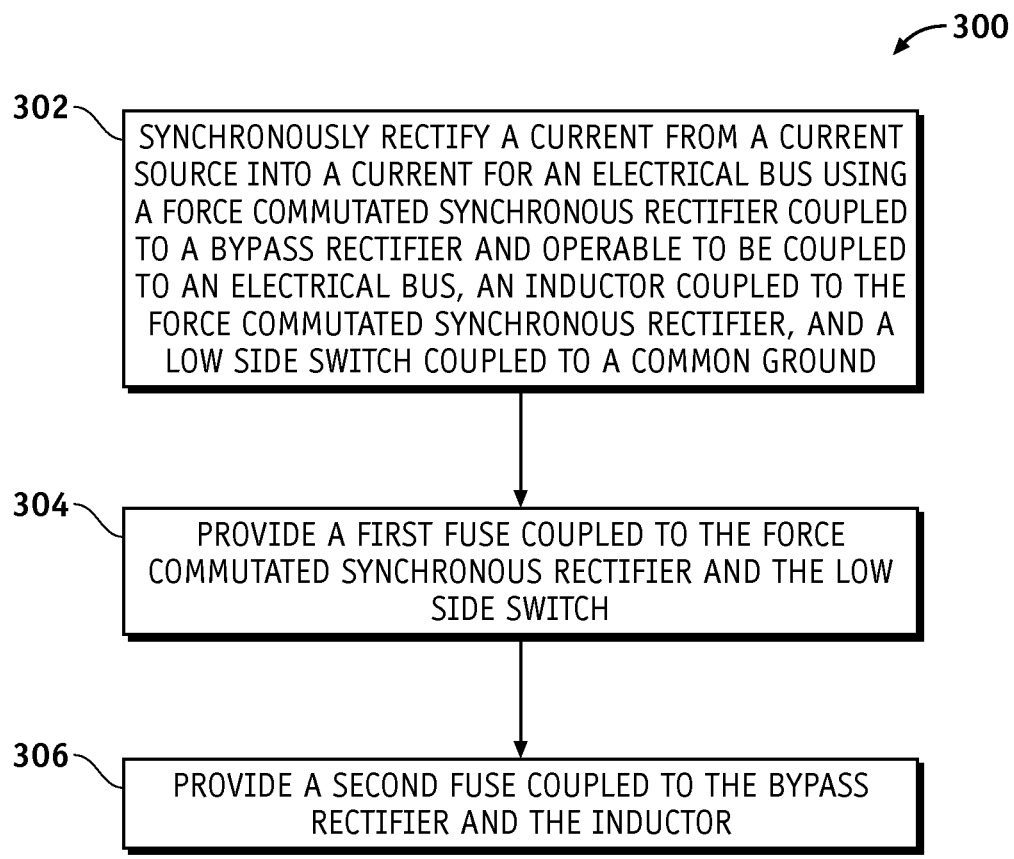
FIG. 3 is an illustration of an exemplary flowchart showing an automatic fault tolerant synchronous rectified PWM regulation process according to an embodiment of the disclosure.

FIG. 3 is an illustration of an exemplary flowchart showing an automatic fault tolerant synchronous rectified PWM regulation process 300 (process 300) according to an embodiment of the disclosure. The various tasks performed in connection with the process 300 may be performed mechanically, by software, hardware, firmware, or any combination thereof. It should be appreciated that the process 300 may include any number of additional or alternative tasks, the tasks shown in FIG. 3 need not be performed in the illustrated order, and the process 300 may be incorporated into a more comprehensive procedure or process having additional functionality not described in detail herein.

For illustrative purposes, the following description of process 300 may refer to elements mentioned above in connection with FIGS. 1-2. In practical embodiments, portions of the process 300 may be performed by different elements of the systems 100-200 such as: the force commutated synchronous rectifier S1 (high side switch), the low side switch Q1, the output capacitor C1, the input capacitor C2, the low side fuse F1, the fuse F2, the inductor L1, the bypass rectifier CR1, the fuse F3, the fuse F4, the current source Isp, and the electrical bus 202, etc. The process 300 may have functions, material, and structures that are similar to the embodiments shown in FIGS. 1-2. Therefore common features, functions, and elements may not be redundantly described here.

Process 300 may begin by synchronously rectifying a current from the current source Isp into a current for the electrical bus 202 using the force commutated synchronous rectifier S1 coupled to the bypass rectifier CR1 and operable to be coupled to the electrical bus 202, an inductor L1 coupled to the force commutated synchronous rectifier S1, and the low side switch Q1 coupled to the common ground 204 (task 302);

Process 300 may continue by providing the first fuse F1 coupled to the force commutated synchronous rectifier S1 and the low side switch Q1 (task 304).

Process 300 may continue by providing the second fuse F2 coupled to the bypass rectifier CR1 and the inductor L1 (task 306).

Figure 4:
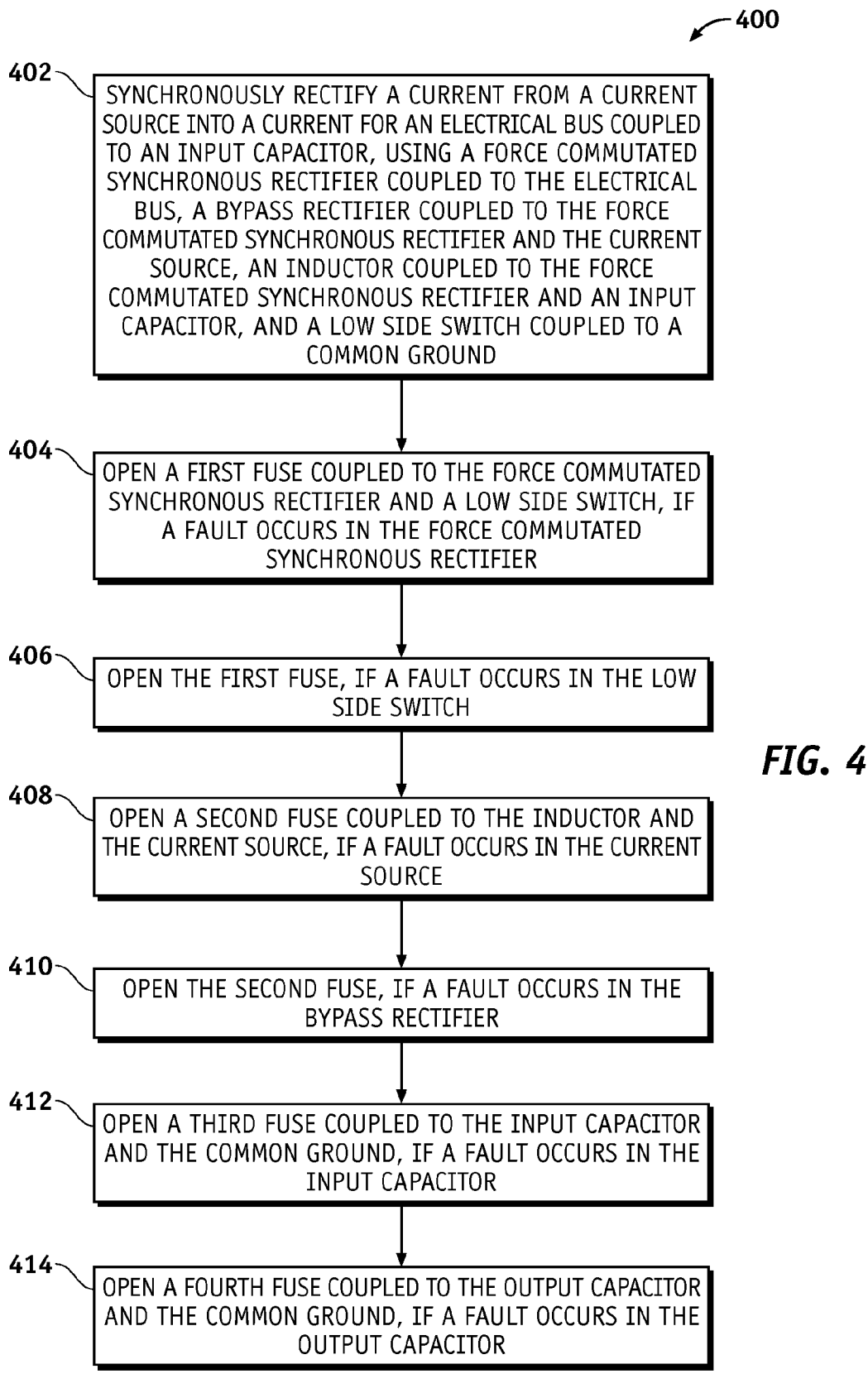
FIG. 4 is an illustration of an exemplary flowchart showing a process for operating a fault tolerant synchronous rectified PWM regulator system according to an embodiment of the disclosure.

FIG. 4 is an illustration of an exemplary flowchart showing a process 400 for operating the fault tolerant synchronous rectified PWM regulator system 200 according to an embodiment of the disclosure. The various tasks performed in connection with the process 400 may be performed mechanically, by software, hardware, firmware, or any combination thereof. It should be appreciated that the process 400 may include any number of additional or alternative tasks, the tasks shown in FIG. 4 need not be performed in the illustrated order, and the process 400 may be incorporated into a more comprehensive procedure or process having additional functionality not described in detail herein.

For illustrative purposes, the following description of process 400 may refer to elements mentioned above in connection with FIGS. 1-2. In practical embodiments, portions of the process 400 may be performed by different elements of the systems 100-200 such as: the force commutated synchronous rectifier S1 (high side switch), the low side switch Q1, the output capacitor C1, the input capacitor C2, the low side fuse F1, the fuse F2, the inductor L1, the bypass rectifier CR1, the fuse F3, the fuse F4, the current source Isp, and the electrical bus 202, etc. The process 400 may have functions, material, and structures that are similar to the embodiments shown in FIGS. 1-2. Therefore common features, functions, and elements may not be redundantly described here.

Process 400 may begin by synchronously rectifying a current from a the current source Isp into a current for the electrical bus 202 coupled to the input capacitor C2, using the force commutated synchronous rectifier S1 coupled to the electrical bus 202, the bypass filter CR1 coupled to the force commutated synchronous rectifier S1 and the current source Isp, the inductor L1 coupled to the force commutated synchronous rectifier S1 and the input capacitor C2, and the low side switch Q1 coupled to the common ground 204 (task 402);

Process 400 may continue by opening a first fuse such as the low side fuse F1 coupled to the force commutated synchronous rectifier S1 and the low side switch Q1, if a fault occurs in the force commutated synchronous rectifier S1 (task 404).

Process 400 may continue by opening a first fuse such as the fuse F1, if a fault occurs in the low side switch Q1 (task 406).

Process 400 may continue by opening a second fuse such as the fuse F2 coupled to the bypass rectifier CR1 and the inductor L1, if a fault occurs in the current source Isp (task 408).

Process 400 may continue by opening the second fuse F2, if a fault occurs in the bypass rectifier CR1 (task 410).

Process 400 may continue by opening a third fuse such as the fuse F3 coupled to the input capacitor C2 and the common ground 204, if a fault occurs in the input capacitor C2 (task 412).

Process 400 may continue by opening a fourth fuse such as the fuse F4 coupled to the output capacitor C1 and the common ground 204, if a fault occurs in the output capacitor C1 (task 414).

In this way, embodiments of the disclosure automatically clear faults when any power stage device fails in a shorted mode. A force commutated synchronous rectifier is used to reduce power dissipation. Lower power dissipation reduces the weight of the power stage devices since less heat sink material is required and components may be packaged more densely. In this manner, weight, such as spacecraft weight, can be reduced since less thermal management hardware is required. This weight savings also translates into space and cost savings, which is needed for substantially all types of power source/load interaction devices.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-2 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. A fault tolerant synchronous rectifier PWM regulator system comprising:
a force commutated synchronous rectifier comprising an intrinsic body diode, and operable to be coupled to an electrical bus and eliminate a reverse recovery time of the intrinsic body diode by forcing a commutating current across the intrinsic body diode:
a low side switch operable to be coupled to a common ground;
a first fuse coupled to the force commutated synchronous rectifier and the low side switch, and operable to open in response to a first fault whereby the electrical bus remains coupled to a current source;
an inductor coupled to the first fuse, the force commutated synchronous rectifier, and the low side switch;
a second fuse coupled to the inductor and operable to be coupled to the current source, and operable to open in response to a second fault whereby the electrical bus remains coupled to the current source; and
a bypass rectifier coupled to the second fuse, and the force commutated synchronous rectifier, and operable to be coupled to the current source.

2. The system according to claim 1, wherein the first fuse opens in response to the first fault in the force commutated synchronous rectifier.

3. The system according to claim 1, wherein the first fuse opens in response to the first fault in the low side switch.

4. The system according to claim 1, wherein the second fuse opens in response to the second fault in the current source.

5. The system according to claim 1, wherein the second fuse opens in response to the second fault comprising a short through the bypass rectifier.

6. The system according to claim 1, wherein the current source comprises at least one solar panel.

7. The system according to claim 1, further comprising the electrical bus coupled to the force commutated synchronous rectifier, wherein the electrical bus comprises a spacecraft power bus.

8. The system according to claim 1, further comprising:
an input capacitor coupled to the inductor; and
a third fuse coupled in series to the input capacitor and the common ground, and operable to open in response to a third fault in the input capacitor.

9. The system according to claim 8, wherein the third fuse comprises a series redundant capacitor.

10. The system according to claim 1, further comprising:
an output capacitor operable to be coupled to the electrical bus; and
a fourth fuse coupled in series to the output capacitor and the common ground, and operable to open in response to a fault in the output capacitor.

11. The system according to claim 10, wherein the fourth fuse comprises a series redundant capacitor.

12. The system according to claim 1, wherein the force commutated synchronous rectifier reduces power dissipation.

13. The system according to claim 1, wherein the force commutated synchronous rectifier comprises:
a field effect transistor (FET) switch comprising a gate terminal, a drain terminal, a source terminal, and an intrinsic body diode comprising a cathode terminal and an anode terminal;
a commutation diode electrically coupled in parallel to the FET switch wherein a cathode terminal of the commutation diode is electrically coupled to the cathode terminal of the intrinsic body diode; and
a selectively controlled forced commutation current source electrically coupled to the commutation diode, and operable to pass a commutation current from the commutation diode to the FET switch, while the FET switch is switched on, whereby a commutation current passes from the cathode terminal of the intrinsic body diode to the anode terminal of the intrinsic body diode.

14. An automatic fault tolerant synchronous rectified PWM regulation method, the method comprising:
synchronously rectifying a current from a current source into a current for an electrical bus using a force commutated synchronous rectifier coupled to a bypass rectifier and operable to be coupled to an electrical bus, an inductor coupled to the force commutated synchronous rectifier, and a low side switch coupled to a common ground;
forcing a commutating current across an intrinsic body diode to eliminate a reverse recovery time of the intrinsic body diode, the force commutated synchronous rectifier comprising the intrinsic body diode;
providing a first fuse coupled to the force commutated synchronous rectifier and the low side switch; and
providing a second fuse coupled to the bypass rectifier and the inductor.

15. The method according to claim 14, further comprising:
opening the first fuse in response to a fault in the force commutated synchronous rectifier; and
opening the first fuse in response to a fault in the low side switch.

16. The method according to claim 14, further comprising opening the second fuse in response to a fault in the current source.

17. The method according to claim 14, further comprising:
providing the bypass rectifier coupled the second fuse and the force commutated synchronous rectifier, and operable to be coupled to the current source; and
opening the second fuse in response to a fault in the bypass rectifier.

18. The method according to claim 14, further comprising:
providing an input capacitor coupled to the inductor;
providing a third fuse coupled in series to the input capacitor and the common ground; and
opening the third fuse in response to a fault in the input capacitor.

19. The method according to claim 14, further comprising:
providing an output capacitor operable to be coupled to the electrical bus;
providing a fourth fuse coupled in series to the output capacitor and the common ground; and
opening the fourth fuse in response to a fault in the output capacitor.

20. A method for operating a fault tolerant synchronous rectification of a PWM regulator system, the method comprising:
synchronously rectifying a first current from a current source into a second current for an electrical bus coupled to an input capacitor, using a force commutated synchronous rectifier coupled to the electrical bus, a bypass rectifier coupled to the force commutated synchronous rectifier and the current source, an inductor coupled to the force commutated synchronous rectifier and an input capacitor, and a low side switch coupled to a common ground;

forcing a commutating current across an intrinsic body diode to eliminate a reverse recovery time of the intrinsic body diode, the force commutated synchronous rectifier comprising the intrinsic body diode;

opening a first fuse coupled to the force commutated synchronous rectifier and the low side switch, if a first fault occurs in the force commutated synchronous rectifier;

opening the first fuse, if a second fault occurs in the low side switch;

opening a second fuse, if a third fault comprising a short through the bypass rectifier occurs in the bypass rectifier;

opening a third fuse coupled to the input capacitor and the common ground, if a fourth fault occurs in the input capacitor; and opening a fourth fuse coupled to an output capacitor and the common ground, if a fifth fault occurs in the output capacitor; and maintaining a current flow from the current source to the electrical bus in a presence of the first fault, the second fault, the third fault, the fourth fault and the fifth fault.

* * * * *